US010638445B2

(12) United States Patent
Nakano et al.

(10) Patent No.: US 10,638,445 B2
(45) Date of Patent: Apr. 28, 2020

(54) VEHICLE-MOUNTED COMMUNICATION DEVICE AND COMMUNICATION METHOD

(71) Applicant: CLARION CO., LTD., Saitama (JP)

(72) Inventors: Mutsumi Nakano, Saitama (JP);
Keisuke Mutou, Saitama (JP);
Tomonori Tanaka, Saitama (JP)

(73) Assignee: Clarion Co., Ltd., Saitama (JP)

( * ) Notice: Subject to any disclaimer, the term of this patent is extended or adjusted under 35 U.S.C. 154(b) by 0 days.

(21) Appl. No.: 16/470,649

(22) PCT Filed: Dec. 22, 2017

(86) PCT No.: PCT/JP2017/046122
§ 371 (c)(1),
(2) Date: Jun. 18, 2019

(87) PCT Pub. No.: WO2018/123864
PCT Pub. Date: Jul. 5, 2018

(65) Prior Publication Data
US 2019/0327704 A1    Oct. 24, 2019

(30) Foreign Application Priority Data

Dec. 27, 2016  (JP) .................................. 2016-252350
Nov. 28, 2017  (JP) .................................. 2017-227719

(51) Int. Cl.
*H04W 24/00*  (2009.01)
*H04W 64/00*  (2009.01)
*G08G 1/00*   (2006.01)

(52) U.S. Cl.
CPC .............. *H04W 64/00* (2013.01); *G08G 1/20* (2013.01)

(58) Field of Classification Search
CPC ................................. H04W 64/00; H04W 4/02
(Continued)

(56) References Cited

U.S. PATENT DOCUMENTS 9,832,241 B1 *  11/2017  Hayward ............... G01C 21/34
2012/0065876 A1   3/2012  Kadowaki et al.
2019/0122529 A1 *  4/2019  Boyt .................... G08B 25/006

FOREIGN PATENT DOCUMENTS

JP    2014-130550 A    7/2014
JP    2016-169974 A    9/2016
WO    2011/013189 A    3/2012

OTHER PUBLICATIONS

International Preliminary Report on Patentability of PCT Application No. PCT/JP2017/046122 dated Jul. 11, 2019.
(Continued)

*Primary Examiner* — Temica M Beamer
(74) *Attorney, Agent, or Firm* — IP Business Solutions, LLC

(57) ABSTRACT

An object is to enable a receiving side to estimate a position of a vehicle on a transmission side to be estimated with high accuracy. A vehicle-mounted communication device 1 loaded into a vehicle includes a vehicle-to-vehicle communication unit 15, a position estimation information acquisition unit 14 which periodically acquires a plurality of types of position estimation information, a storage unit 11 which stores the plurality of types of position estimation information with acquisition time information representing an acquisition time at which each of the position estimation information has been acquired associated with the position estimation information, and a control unit 10 which causes the vehicle-to-vehicle communication unit 15 to transmit vehicle information, in which among the transmitted plurality of types of position estimation information, the at least one type of position estimation information is the position estimation information with which the acquisition time information representing the latest acquisition time is associated among the one type of position estimation information, and the other type of position estimation information (Continued)

different from the one type of position estimation information is the position estimation information with which the acquisition time information representing the acquisition time closest to the acquisition time at which the one type of position estimation information has been acquired is associated.

6 Claims, 8 Drawing Sheets

(58) Field of Classification Search
　　　USPC .............................. 455/456.1, 456.2, 456.6
　　　See application file for complete search history.

(56) References Cited

OTHER PUBLICATIONS

Written Opinion of the International Searching Authority of PCT Application No. PCT/JP2017/046122 dated Mar. 13, 2018.
International Search Report for corresponding International Patent Application No. PCT/JP2017/046122 dated Mar. 13, 2018.
Written Opinion for corresponding International Patent Application No. PCT/JP2017/046122 dated Mar. 13, 2018.

* cited by examiner

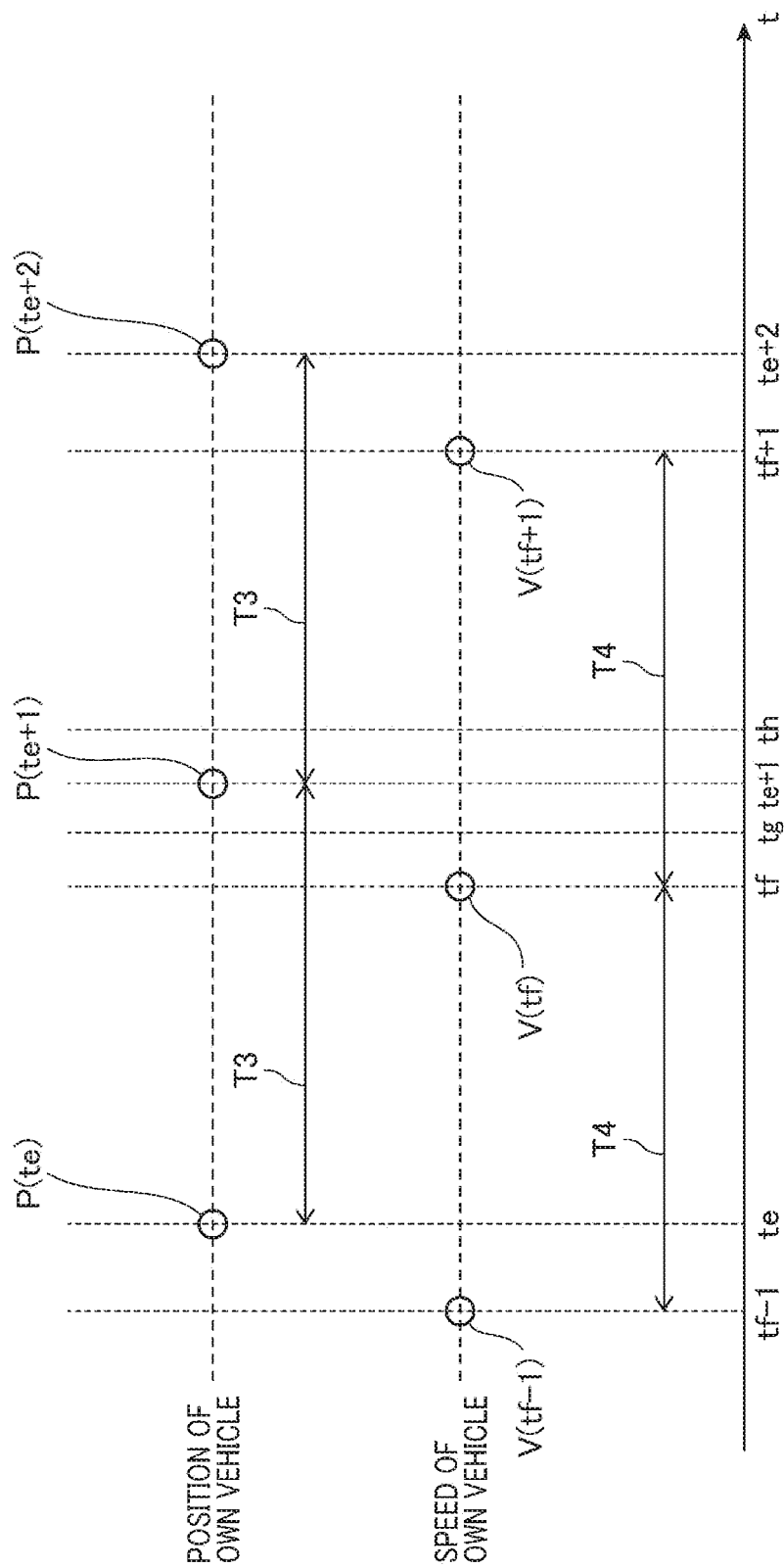

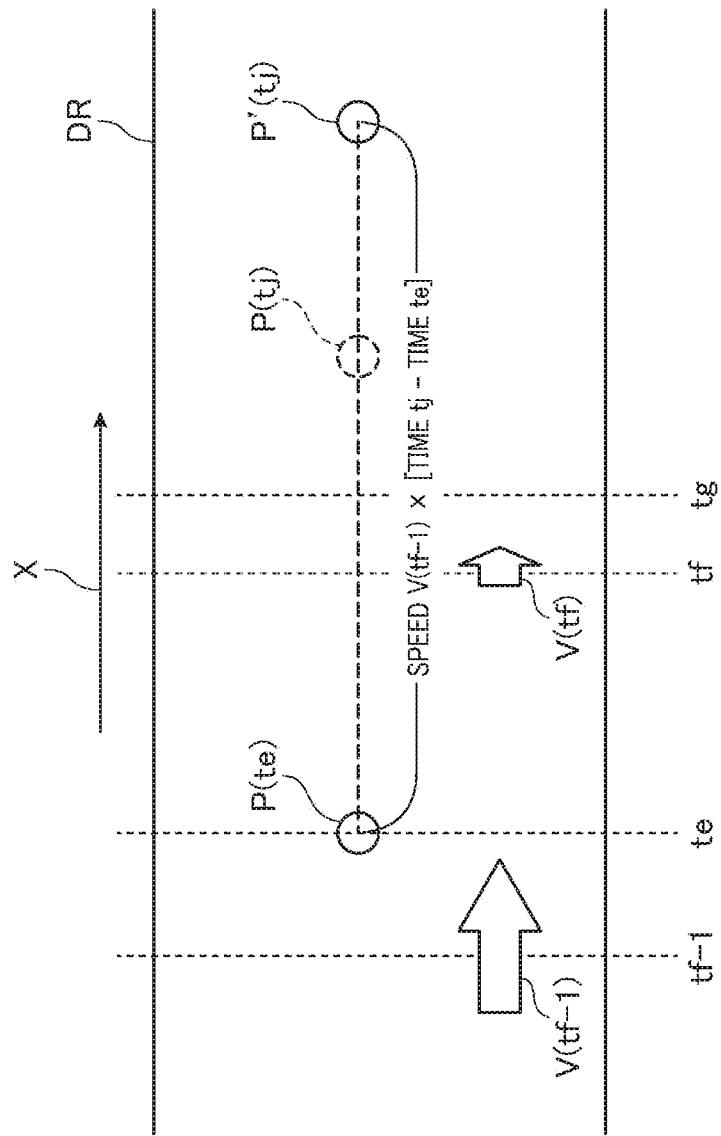

VEHICLE-MOUNTED COMMUNICATION DEVICE AND COMMUNICATION METHOD

TECHNICAL FIELD

The present invention relates to a vehicle-mounted communication device and a communication method.

BACKGROUND ART

Conventionally, a technique for a transmission side to transmit a plurality of types of information such as its own position and speed to a receiving side such that the receiving side can estimate the position of the transmission side has been known (see, e.g., Patent Literature 1). Patent Literature 1 discloses a system for a receiving side to receive information such as a position and a speed of another vehicle and display a position of the other vehicle based on the received information and a position of the other vehicle estimated when a receiving status is bad, to inhibit an erroneous position of the other vehicle from being presented to a user.

CITATION LIST

Patent Literature

[Patent Literature 1]
Japanese Patent Laid-Open No. 2014-130550

SUMMARY OF INVENTION

Technical Problem

A vehicle on a transmission side may not acquire a plurality of types of information to be transmitted to a receiving side at the same timing. Accordingly, the receiving side receives the plurality of types of information which are respectively acquired at different timings. Even if a position of the vehicle on the transmission side is estimated based on the received information, the position may be unable to be estimated with high accuracy.

Therefore, the present invention is directed to enabling a receiving side to estimate a position of a vehicle on a transmission side with high accuracy.

Solution to Problem

To achieve the above-described object, an aspect of the present invention provides a vehicle-mounted communication device loaded into a vehicle, including a communication unit which transmits information, a position estimation information acquisition unit which periodically acquires a plurality of types of position estimation information capable of estimating a position of the vehicle, a storage unit which stores the plurality of types of position estimation information acquired by the position estimation information acquisition unit with acquisition time information representing an acquisition time at which each of the position estimation information has been acquired associated with the position estimation information, and a control unit which causes the communication unit to transmit information including the at least plurality of types of position estimation information, being characterized in that among the transmitted plurality of types of position estimation information, the at least one type of position estimation information is the position estimation information with which the acquisition time information representing the latest acquisition time is associated among the one type of position estimation information, and the other type of position estimation information different from the one type of position estimation information is the position estimation information with which the acquisition time information representing the acquisition time closest to the acquisition time at which the one type of position estimation information has been acquired is associated.

The aspect of the present invention is characterized in that the plurality of types of position estimation information include vehicle position information representing a position of the vehicle and vehicle speed information representing a speed of the vehicle.

The aspect of the present invention is characterized in that a timing at which the position estimation information acquisition unit acquires the vehicle position information and a timing at which the position estimation information acquisition unit acquires the vehicle speed information are not synchronized with each other.

The aspect of the present invention is characterized in that the control unit compares a latest position time as the latest acquisition time of the vehicle position information with a latest speed time as the latest acquisition time of the vehicle speed information, and causes the communication unit to transmit, when the latest position time is newer than the latest speed time, information including the vehicle speed information with which the acquisition time information representing the latest speed time is associated and the vehicle position information with which the acquisition time information representing the acquisition time closest to the latest speed time is associated.

The aspect of the present invention is characterized in that the control unit compares a latest position time as the latest acquisition time of the vehicle position information with a latest speed time as the latest acquisition time of the vehicle speed, and causes the communication unit to transmit, when the latest speed time is newer than the latest position time, information including the vehicle position information with which the acquisition time information representing the latest position time is associated and the vehicle speed information with which the acquisition time information representing the acquisition time closest to the latest position time is associated.

The aspect of the present invention is characterized in that the control unit causes the communication unit to transmit, when a difference between a speed of the vehicle at a latest speed time as the latest acquisition time of the vehicle speed information and a speed of the vehicle at the acquisition time before the latest speed time is a predetermined threshold value or more, information including the vehicle speed information with which the acquisition time information representing the latest speed time is associated and the vehicle position information with which the acquisition time information representing a latest position time as the latest acquisition time of the vehicle position information is associated.

To achieve the above-described object, a communication method according to another aspect of the present invention is characterized by including periodically acquiring a plurality of types of position estimation information capable of estimating a position of a vehicle, storing the acquired plurality of types of position estimation information with acquisition time information representing an acquisition time at which each of the position estimation information has been acquired associated with the position estimation information, and transmitting information including the plurality of types of position estimation information, among which the at least one type of position estimation information is the position estimation information with which the acquisition time information representing the latest acquisition time is associated among the one type of position estimation information and the other type of position estimation information different from the one type of position estimation information is the position estimation information with which the acquisition time information representing the acquisition time closest to the acquisition time at which the one type of position estimation information has been acquired is associated.

Advantageous Effect of Invention

According to the aspect of the present invention, a receiving side can estimate a position of a vehicle on a transmission side with high accuracy.

BRIEF DESCRIPTION OF DRAWINGS

FIG. 7 is a diagram illustrating an example of respective timings at which a position of the own vehicle and a speed of the own vehicle are acquired.

FIG. 8 is a diagram for describing a position of the own vehicle estimated by the other vehicle.

DESCRIPTION OF EMBODIMENT

Figure 1:
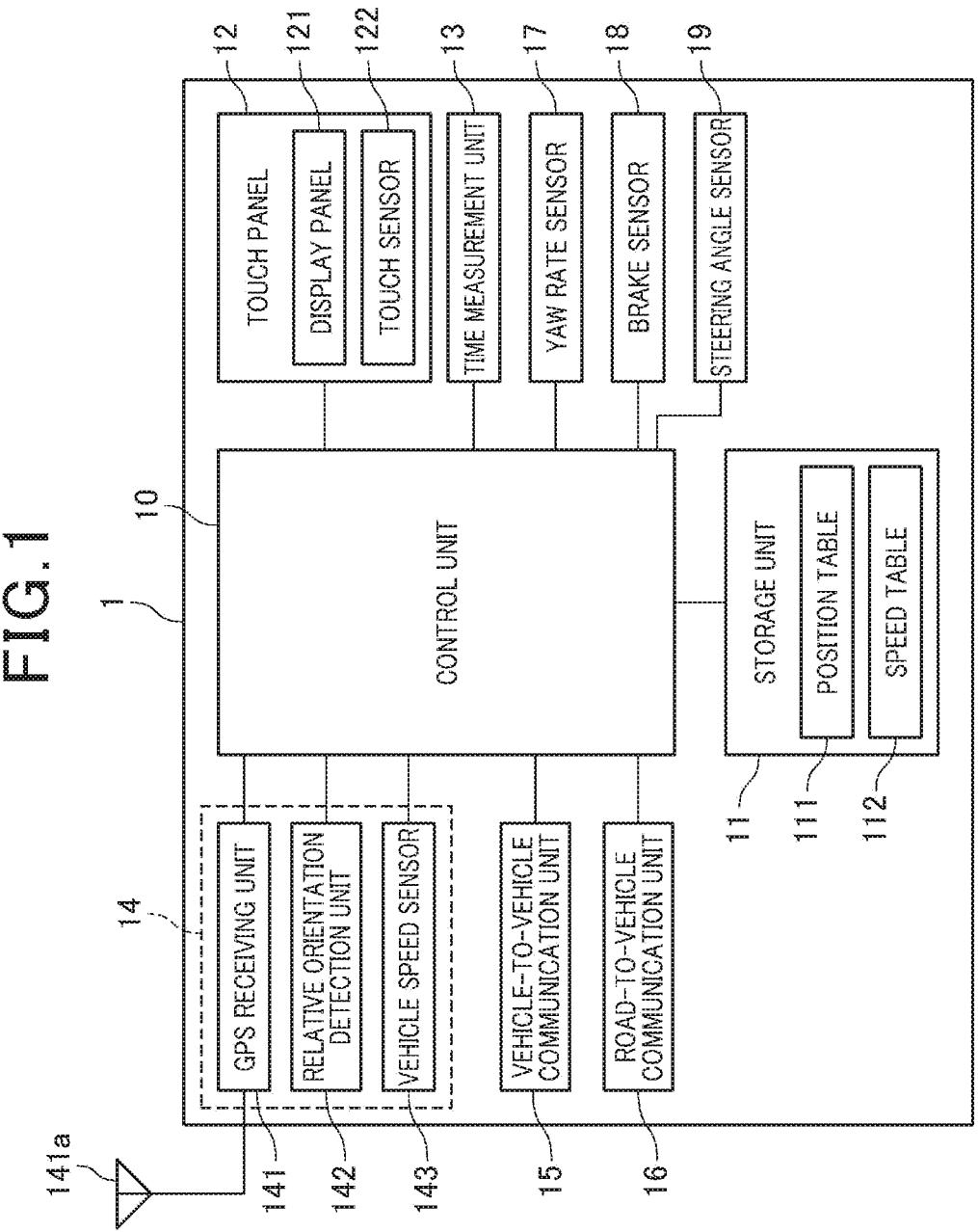
FIG. 1 is a block diagram illustrating a functional configuration of a vehicle-mounted communication device.

FIG. 1 is a block diagram illustrating a functional configuration of a vehicle-mounted communication device 1.

The vehicle-mounted communication device 1 is a device loaded into a vehicle and has a function of displaying a map and displaying a current position of a vehicle on the map and a function of displaying a map and displaying a route to a destination on the map to guide the vehicle on the route to the destination, for example. The vehicle-mounted communication device 1 according to the present embodiment has a function of communicating with another vehicle, as described in detail below.

In the following description, a vehicle loaded with the vehicle-mounted communication device 1 is represented as an "own vehicle". Another vehicle different from the own vehicle is represented as "another vehicle".

As illustrated in FIG. 1, the vehicle-mounted communication device 1 includes a control unit 10, a storage unit 11, a touch panel 12, a time measurement unit 13, a position estimation information acquisition unit 14, a vehicle-to-vehicle communication unit 15 (a communication unit), a road-to-vehicle communication unit 16, a yaw rate sensor 17, a brake sensor 18, and a steering angle sensor 19.

The control unit 10 includes a CPU, a ROM, a RAM, and other control circuits, for example, and controls each of the units in the vehicle-mounted communication device 1.

The storage unit 11 includes a non-volatile memory such as a hard disk or an EEPROM, and rewritably stores data.

The storage unit 11 stores a position table 111 and a speed table 112. The position table 111 and the speed table 112 will be described below.

The touch panel 12 includes a display panel 121 and a touch sensor 122. The display panel 121 is composed of a liquid crystal display or an EL (Electro Luminescent) display, for example, and displays various types of information on the display panel 121 under control of the control unit 10. The touch sensor 122 is arranged while overlapping the display panel 121, and detects a touch operation by a user and outputs the touch operation to the control unit 10.

The time measurement unit 13 performs a time measurement operation based on a built-in clock, a GPS clock, and a received radio signal, for example, and outputs information representing a current time to the control unit 10. The information representing the current time is information including year, month, day, and time, for example, "12:23:45, E F, ABCD".

Note that in the present embodiment, it is assumed that a time when the own vehicle measures time and a time when the other vehicle measures time are synchronized with each other.

The position estimation information acquisition unit 14 includes a GPS receiving unit 141, a relative orientation detection unit 142, and a vehicle speed sensor 143, and acquires a plurality of types of position estimation information. The position estimation information is information used when a position of the own vehicle is estimated. The control unit 10 can estimate the position of the own vehicle by using the position estimation information. The other vehicle can estimate the position of the own vehicle by using the position estimation information acquired by the position estimation information acquisition unit 14. The specific position estimation information will be described below.

The GPS receiving unit 141 periodically receives a GPS signal transmitted from a GPS satellite via a GPS antenna 141a. The GPS receiving unit 141 measures a distance between the own vehicle and the GPS satellite and a rate of change in the distance for a predetermined number or more of satellites based on the received GPS signal, to acquire by calculation at least a position of the own vehicle and a bearing in a traveling direction of the own vehicle (hereinafter represented as "an orientation of the own vehicle"). The GPS receiving unit 141 outputs information representing the position of the own vehicle (hereinafter represented as "own vehicle position information") (vehicle position information) and information representing the orientation of the own vehicle (hereinafter represented as "own vehicle orientation information") to the control unit 10. The own vehicle position information and the own vehicle orientation information correspond to position estimation information, and are respectively different types of position estimation information.

The relative orientation detection unit 142 includes a gyroscope sensor and an acceleration sensor. The gyroscope sensor is composed of a vibrating gyroscope, for example, and detects a relative orientation (e.g., a turning amount in a yaw-axis direction) of the own vehicle. The acceleration sensor detects an acceleration acting on the own vehicle (e.g., an inclination of the own vehicle toward the traveling direction). The relative orientation detection unit 35 outputs a detection result to the control unit 10.

The vehicle speed sensor 143 detects a number of revolutions per unit time of an axle, and periodically acquires a vehicle speed of the own vehicle based on the detected number of revolutions. The vehicle speed sensor 143 outputs information representing the detected vehicle speed of the own vehicle (hereinafter represented as "own vehicle speed information") (vehicle speed information) to the control unit 10. The own vehicle speed information corresponds to position estimation information, and is position estimation information of a type different from the respective types of the own vehicle position information and the own vehicle orientation information.

The vehicle-to-vehicle communication unit 15 mutually transmits vehicle information (information) to and from another vehicle positioned around the own vehicle by wireless communication according to a wireless communication standard such as IEEE802.11p. Examples of the vehicle information include a CAM (Cooperative Awareness Message) and a BSM (Basic Safety Message). The vehicle information includes the own vehicle position information, the own vehicle speed information, the own vehicle orientation information, identification information for identifying the own vehicle, and acquisition time information representing an acquisition time as a time when position estimation information has been acquired, for example. The vehicle information also includes information representing states of the own vehicle such as respective control states of a brake, a handle, and the like, respective lighting states of various types of lights, and a state of a yaw rate. In the present embodiment, it is assumed that the vehicle information includes at least the own vehicle position information, the own vehicle speed information, and acquisition time information representing an acquisition time at which the own vehicle position information has been acquired. The vehicle-to-vehicle communication unit 15 outputs the received vehicle information to the control unit 10.

The road-to-vehicle communication unit 16 receives information transmitted by narrow-band wireless communication such as an optical beacon, a radio wave beacon, or DSRC (Dedicated Short Range Communications) from a road-side device installed on a road side such as an intersection. Examples of information transmitted to the road-to-vehicle communication unit 16 from the road-side device include road information including congestion information or the like and information about a pedestrian. The road-to-vehicle communication unit 16 outputs the received information to the control unit 10.

The yaw rate sensor 17 detects the yaw rate relating to the own vehicle, and outputs information representing the detected yaw rate to the control unit 10.

The brake sensor 18 detects an operation amount (a pressed amount, an angle, a pressure, etc.) of a driver for a brake pedal, and outputs information about the detected operation amount to the control unit 10.

The steering angle sensor 19 detects a steering angle of a steering, and outputs information representing the detected steering angle to the control unit 10.

In recent years, Intelligent Transport Systems (ITS) have been known. The Intelligent Transport Systems are systems for causing a road transportation system and an information communication system to cooperate with each other to highly develop the road transportation system, for example, reflecting in driving of an own vehicle information about another vehicle and information about a road on which the other vehicle travels, for example.

As the intelligent transport systems, a C2X system has been known. The C2X system is a name of a system representing communication between a vehicle and something, and examples include vehicle-to-vehicle communication and road-to-vehicle communication. The vehicle-to-vehicle communication is communication for mutually transmitting vehicle information between an own vehicle and another vehicle positioned around the own vehicle. The road-to-vehicle communication is communication in which an own vehicle receives road information including congestion information or the like and information about a pedestrian who walks on a road, for example, from the road-side device. When the vehicle-to-vehicle communication is performed, the own vehicle and the other vehicle can mutually acquire a position, a state, and the like of the vehicle. When the road-to-vehicle communication is performed, the own vehicle and the other vehicle can each acquire a state of a road on which the vehicle itself travels.

In the vehicle-to-vehicle communication, the other vehicle estimates the position of the own vehicle based on the vehicle information transmitted from the own vehicle. The other vehicle estimates the position of the own vehicle based on the vehicle information transmitted from the own vehicle by at least calculation described below.

Figure 2:
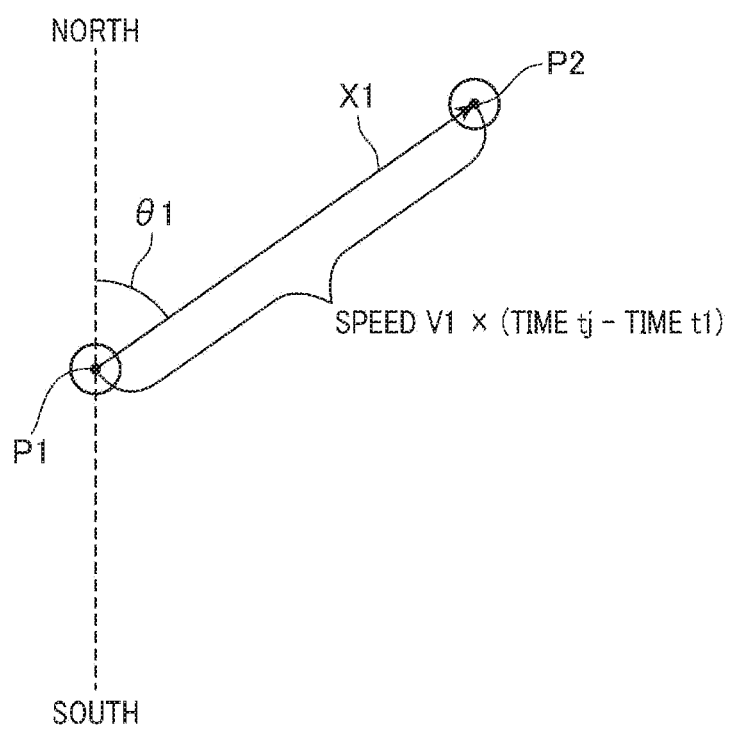
FIG. 2 is a diagram for describing an estimation of a position of an own vehicle by another vehicle.

FIG. 2 is a diagram for describing estimation of a position of the own vehicle by the other vehicle.

In the description illustrated in FIG. 2, it is assumed that the other vehicle has received vehicle information including at least own vehicle position information representing a position P1 as a position of the own vehicle, own vehicle orientation information representing an angle θ1 as an angle corresponding to an orientation of the own vehicle, own vehicle speed information representing a speed V1 as a speed of the own vehicle, and acquisition time information representing a time t1 as an acquisition time at which the own vehicle position information has been acquired. It is also assumed that the own vehicle position information and the own vehicle speed information included in the received vehicle information are each acquisition time information representing a latest acquisition time at a timing at which the own vehicle transmits the vehicle information.

Note that the own vehicle position information representing the position P1 and the own vehicle position information representing the position P2 are information about coordinates representing each of the position P1 and the position P2 and information about a latitude and a longitude representing each of the position P1 and the position P2, for example.

The orientation of the own vehicle means a bearing in a traveling direction of the own vehicle. In an example illustrated in FIG. 2, the orientation of the own vehicle is a bearing in a traveling direction X1. An angle corresponding to the orientation of the own vehicle means a separation angle in a clockwise direction between a direction toward the north and the orientation of the own vehicle in a case of the example illustrated in FIG. 2.

In the description illustrated in FIG. 2, it is assumed that the other vehicle has received the vehicle information including the information from the own vehicle at a time tj.

In vehicle-to-vehicle communication, a relay facility need not be interposed. Thus, the vehicle information can be transmitted in relatively real time between the own vehicle and the other vehicle. However, the other vehicle receives the vehicle information from the own vehicle with a delay of a communication time period from the own vehicle to the other vehicle. The other vehicle calculates a correction amount by which the position of the own vehicle is corrected to consider that the position of the own vehicle changes by the communication time period when estimating the position of the own vehicle.

The other vehicle calculates, as the correction amount, a speed V1 represented by the own vehicle speed information included in the vehicle information times a result obtained by subtracting the time t1 as a time represented by the acquisition time information included in the vehicle information from the time tj as a time at which the other vehicle has received the vehicle information from the own vehicle. That is, the other vehicle calculates "speed V1×(time tj−time t1)" as the correction amount. The correction amount represents a distance in a case where the own vehicle has moved at the speed V1 in a time period from the time t1 to the time tj at which the other vehicle has received the vehicle information.

The other vehicle adds, when it calculates the correction amount, the calculated correction amount to the position P1 represented by the own vehicle position information included in the vehicle information, to estimate the position of the own vehicle. That is, the other vehicle estimates the position P2 as a position which has shifted by a distance of "speed V1×(time tj−time t1)" in the orientation of the own vehicle using the position P1 as a reference as the position of the own vehicle. Thus, the other vehicle can estimate the position of the own vehicle in consideration of an amount of the communication time period in the vehicle-to-vehicle communication because it adds the correction amount when estimating the own vehicle.

However, the other vehicle may be unable to estimate the position of the own vehicle with high accuracy in the following case.

Figure 3:
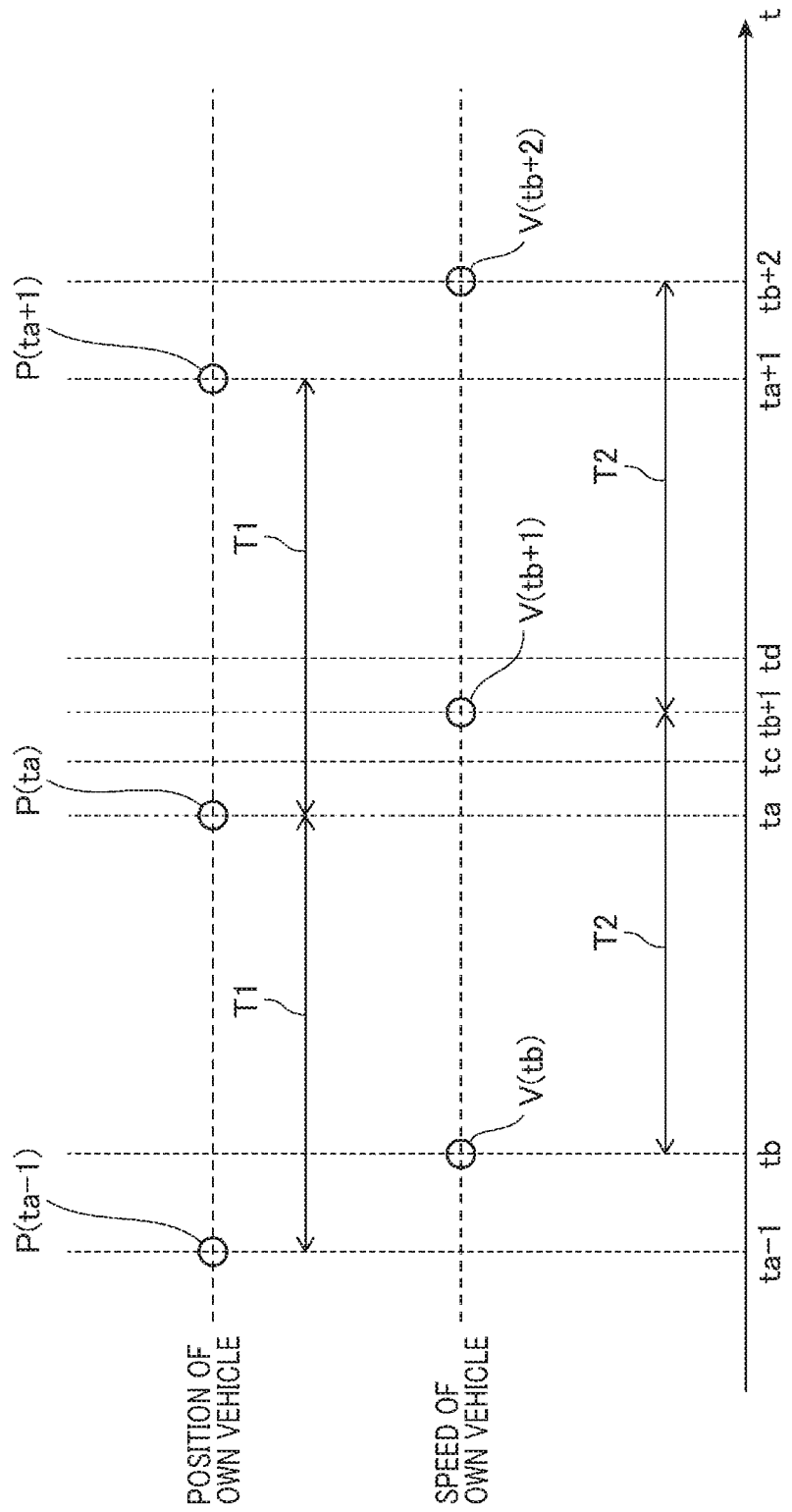
FIG. 3 is a diagram illustrating an example of respective timings at which a position of the own vehicle and a speed of the own vehicle are acquired.

FIG. 3 is a diagram illustrating an example of respective timings at which a position of the own vehicle and a speed of the own vehicle are acquired.

In the example illustrated in FIG. 3, the control unit 10 in the vehicle-mounted communication device 1 in the own vehicle acquires own vehicle position information from the GPS receiving unit 141 periodically at intervals of a time period T1. This time period T1 corresponds to a period in which the GPS receiving unit 141 receives a GPS signal. In the example illustrated in FIG. 3, the control unit 10 in the vehicle-mounted communication device 1 in the own vehicle acquires own vehicle position information representing a position P(ta−1) as the position of the own vehicle at a time ta−1. The control unit 10 in the vehicle-mounted communication device 1 in the own vehicle acquires own vehicle position information representing a position P(ta) as the position of the own vehicle at a time ta after an elapse of the time period T1 from the time ta−1. The control unit 10 in the vehicle-mounted communication device 1 in the own vehicle acquires own vehicle position information representing a position P(ta+1) as the position of the own vehicle at a time ta+1 after an elapse of the time period T1 from the time ta.

In the example illustrated in FIG. 3, the control unit 10 in the vehicle-mounted communication device 1 in the own vehicle acquires own vehicle speed information from the vehicle speed sensor 143 periodically at intervals of a time period T2. This time period T2 corresponds to a period in which the vehicle speed sensor 143 detects a number of revolutions of the axle. In the example illustrated in FIG. 3, the control unit 10 in the vehicle-mounted communication device 1 in the own vehicle acquires own vehicle speed information representing a speed V(tb) as the speed of the own vehicle at a time tb. The control unit 10 in the vehicle-mounted communication device 1 in the own vehicle acquires own vehicle speed information representing a speed V(tb+1) as the speed of the own vehicle at a time tb+1 after an elapse of the time period T2 from the time tb. The control unit 10 in the vehicle-mounted communication device 1 in the own vehicle acquires own vehicle speed information representing a speed V(tb+2) as the speed of the own vehicle at a time tb+2 after an elapse of the time period T2 from the time tb+1.

As illustrated in FIG. 3, a timing at which the control unit 10 in the vehicle-mounted communication device 1 in the own vehicle acquires the own vehicle position information and a timing at which the control unit 10 acquires the own vehicle speed information are not synchronized with each other. The reason why the timing at which the own vehicle position information is acquired and the timing at which the own vehicle speed information is acquired are not synchronized with each other is that position estimation information are respectively acquired in different modules depending on types and the position of the own vehicle and the speed of the own vehicle, for example, are respectively calculated by different processes.

Here, it is assumed that a timing at which the own vehicle transmits the vehicle information to the other vehicle is a time tc. In this case, the control unit 10 in the vehicle-mounted communication device 1 in the own vehicle includes, for the own vehicle position information and the own vehicle speed information, the own vehicle position information and the own vehicle speed information respective acquisition times of which are latest times in the vehicle information, and transmits the vehicle information to the other vehicle. That is, in a case illustrated in FIG. 3, the vehicle-mounted communication device 1 in the own vehicle transmits vehicle information including the own vehicle position information representing the position P(ta) acquired at the time ta as the position of the own vehicle and the own vehicle speed information representing the speed V(tb) acquired at the time tb as the speed of the own vehicle to the other vehicle.

The other vehicle estimates, when it receives the vehicle information, the position of the own vehicle based on acquisition information representing the time ta, the own vehicle position information representing the position P(ta), and the own vehicle speed information representing the speed V(tb). However, as illustrated in FIG. 3, the time tb at which the speed V(tb) is acquired more greatly shifts from the time ta at which the position P(ta) is acquired than the time tb+1 at which the speed V(tb+1) is acquired. Accordingly, the speed of the own vehicle at the time ta may change from the speed V(tb) at the time tb. Therefore, the other vehicle may use, when it uses the speed V(tb) as a speed acquired at the time ta in estimating the position of the own vehicle, a speed deviating from an actual speed of the own vehicle at the time ta and may be unable to calculate a correction amount with high accuracy. This corresponds to inability of the other vehicle to estimate the position of the own vehicle with high accuracy.

Thus, the other vehicle may be unable to estimate the position of the own vehicle with high accuracy when it receives the vehicle information including the own vehicle position information and the own vehicle speed information the respective acquisition times of which have greatly shifted from each other.

Therefore, the vehicle-mounted communication device 1 in the own vehicle according to the present embodiment performs an operation described below.

Figure 4:
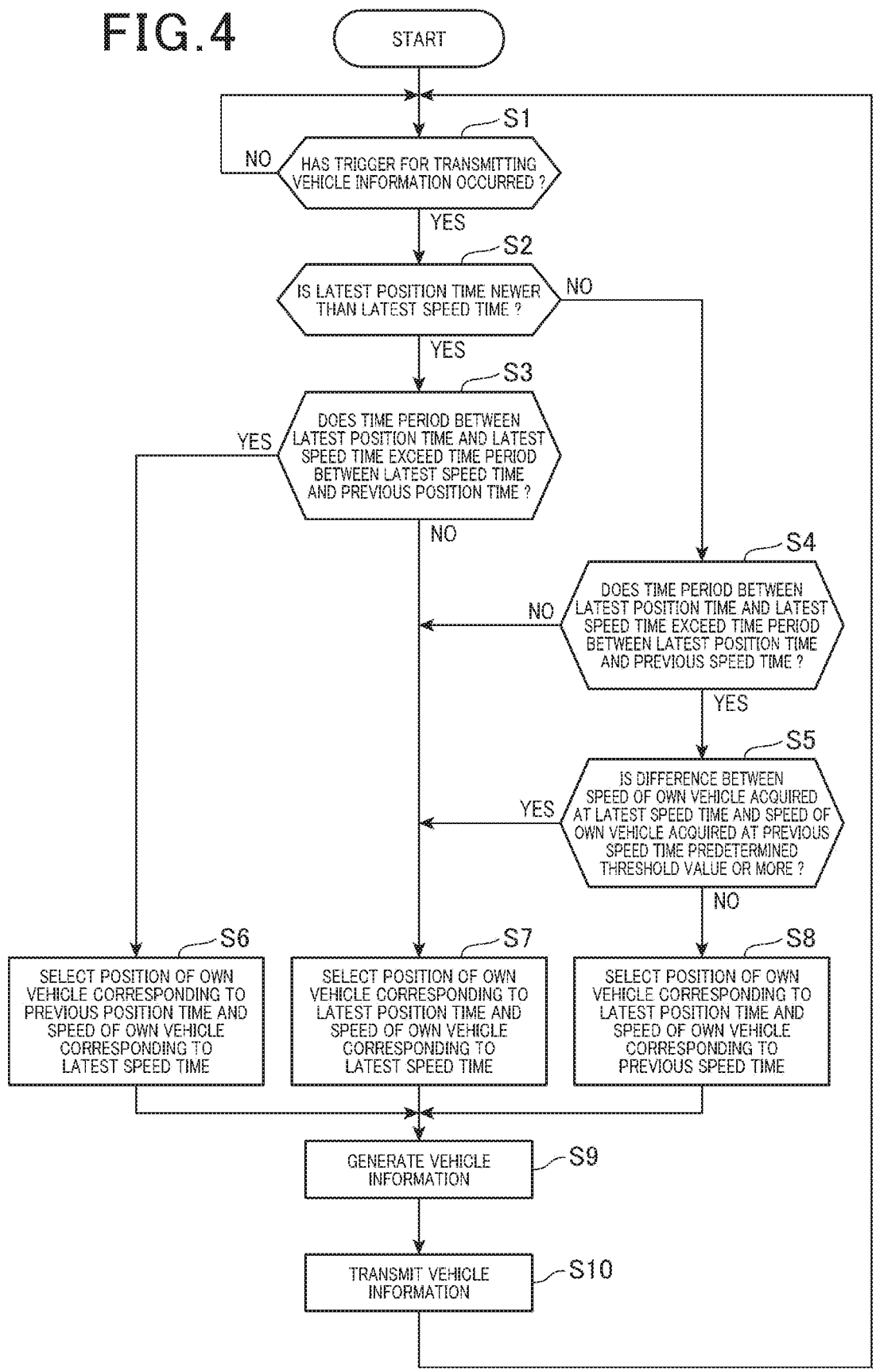
FIG. 4 is a flowchart illustrating an operation of the vehicle-mounted communication device in the own vehicle.

FIG. 4 is a flowchart illustrating an operation of the vehicle-mounted communication device 1 in the own vehicle.

In the description of the operation of the vehicle-mounted communication device 1 in the own vehicle illustrated in FIG. 4, it is assumed that a system of the vehicle-mounted communication device 1 is started, triggered by an ignition of the own vehicle being turned on and an accessory power supply of the own vehicle being turned on, for example.

The control unit 10 in the vehicle-mounted communication device 1 judges whether or not a trigger for the vehicle-to-vehicle communication unit 15 to transmit vehicle information to the other vehicle has occurred (step S1).

For example, the control unit 10 judges, when at least any one of a position of the own vehicle, a speed of the own vehicle, and an orientation of the own vehicle has changed by not less than defined values respectively corresponding thereto in a time period of 100 ms to 1000 ms after transmitting previous vehicle information, that a trigger for transmitting the vehicle information to the vehicle has occurred.

Then, the control unit 10 refers to the position table 111 and the speed table 112, and judges whether or not a latest position time is newer than a latest speed time (step S2). The latest position time represents a latest acquisition time at which the position of the own vehicle has been acquired. The latest speed time represents a latest acquisition time at which the speed of the own vehicle has been acquired.

Figure 5:
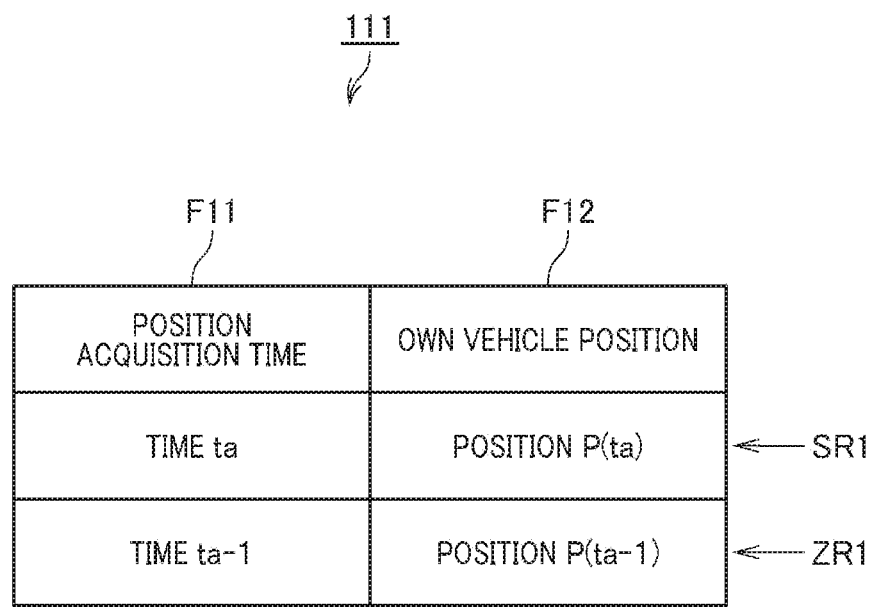
FIG. 5 is a diagram illustrating an example of a position table.

FIG. 5 is a diagram illustrating one example of the position table 111.

As illustrated in FIG. 5, the position table 111 stores a latest acquisition record SR1 and a previous acquisition record ZR1. A position acquisition time field F11 and an own vehicle position field F12 are associated with each of the latest acquisition record SR1 and the previous acquisition record ZR1. The position acquisition time field F11 stores acquisition time information representing an acquisition time at which a position of the own vehicle has been acquired. The own vehicle position field F12 stores own vehicle position information representing the acquired position of the own vehicle.

The latest acquisition record SR1 stores acquisition time information representing a latest position time in the position acquisition time field F11 and stores own vehicle position information representing a position of the own vehicle acquired at the latest position time in the own vehicle position field F12. In the example illustrated in FIG. 5, the latest acquisition record SR1 stores acquisition time information representing a time ta as the latest position time in the position acquisition time field F11 and stores own vehicle position information representing a position P(ta) in the own vehicle position field F12.

The previous acquisition record ZR1 stores acquisition time information representing a previous position time in the position acquisition time field F11 and stores own vehicle position information representing a position of the own vehicle acquired at the previous position time in the own vehicle position field F12. The previous position time is an acquisition time at which the position of the own vehicle has been acquired before the latest position time. If the time ta is set as the latest position time in the example illustrated in FIG. 3, for example, a time ta−1 corresponds to the previous position time. In the example illustrated in FIG. 5, the previous acquisition record ZR1 stores acquisition time information representing the time ta−1 as the previous position time in the position acquisition time field F11 and stores own vehicle position information representing a position P(ta−1) in the own vehicle position field F12.

The control unit 10 updates each of the information stored in the position table 111 every time the GPS receiving unit 141 acquires the position of the own vehicle. In the case illustrated in FIG. 3, for example, it is assumed that the control unit 10 has acquired own vehicle position information representing a position P(ta+1) at a time ta+1. In this case, the control unit 10 rewrites the information stored in the previous acquisition record ZR1 in the position table 111 into information stored in the latest acquisition record SR1 and rewrites the information stored in the latest acquisition record SR1 into acquisition time information representing the time ta+1 as a latest position time and own vehicle position information representing the position P(ta+1) as a position of the own vehicle acquired at the latest position time. By the rewriting, in the previous acquisition record ZR1 in the position table 111, the acquisition time information stored in the position acquisition time field F11 is updated from "time ta−1" to "time ta", and the own vehicle position information stored in the own vehicle position field F12 is updated from "position P(ta−1)" to "position P(ta)". In the latest acquisition record SR1 in the position table 111, the acquisition time information stored in the position acquisition time field F11 is updated from "time ta" to "time ta+1", and the own vehicle position information stored in the own vehicle position field F12 is updated from "position P(ta)" to "position P(ta+1)".

Figure 6:
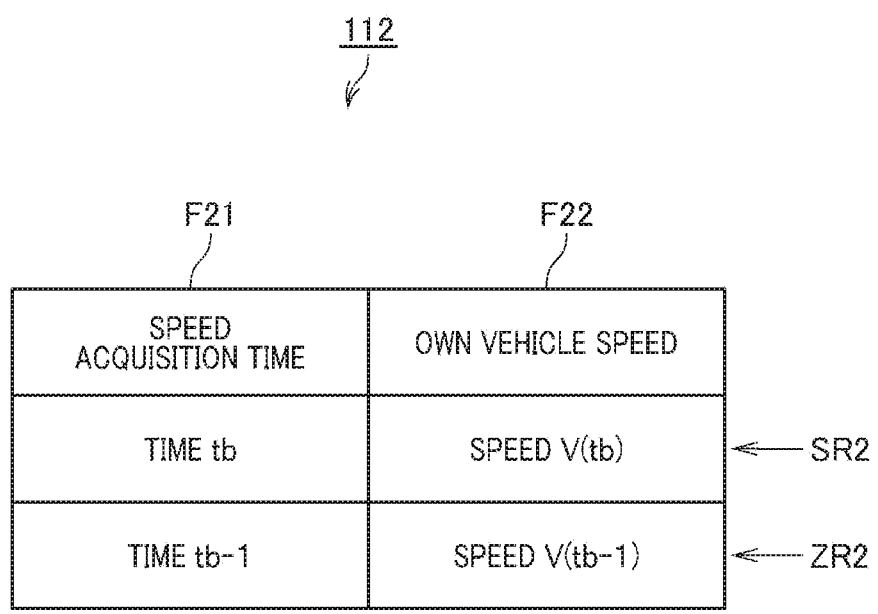
FIG. 6 is a diagram illustrating an example of a speed table.

FIG. 6 is a diagram illustrating one example of the speed table 112.

As illustrated in FIG. 6, the speed table 112 stores a latest acquisition record SR2 and a previous acquisition record ZR2. A speed acquisition time field F21 and an own vehicle speed field F22 are associated with each of the latest acquisition record SR2 and the previous acquisition record ZR2. The speed acquisition time field F21 stores acquisition time information representing an acquisition time at which a speed of the own vehicle has been acquired. The own vehicle speed field F22 stores own vehicle speed information representing the acquired speed of the own vehicle.

The latest acquisition record SR2 stores acquisition time information representing a latest speed time in the speed acquisition time field F21 and stores own vehicle speed information representing a speed of the own vehicle acquired at the latest speed time in the own vehicle speed field F22. In the example illustrated in FIG. 6, the latest acquisition record SR2 stores acquisition time information representing a time tb as the latest speed time in the speed acquisition time field F21 and stores own vehicle speed information representing a speed V(tb) in the own vehicle speed field F22.

The previous acquisition record ZR2 stores acquisition time information representing a previous speed time in the speed acquisition time field F21 and stores own vehicle speed information representing a speed of the own vehicle acquired at the previous speed time in the own vehicle speed field F22. The previous speed time is an acquisition time at which the speed of the own vehicle has been acquired before the latest speed time. If a time tb+1 is set as the latest speed time in the case illustrated in FIG. 3, for example, the time tb corresponds to the previous speed time. In the example illustrated in FIG. 6, the previous acquisition record ZR2 stores acquisition time information representing a time tb−1 as the previous speed time in the speed acquisition time field F21 and stores own vehicle speed information representing a speed V(tb−1) in the own vehicle speed field F22.

The control unit 10 updates each of the information stored in the speed table 112 every time the vehicle speed sensor 143 acquires the speed of the own vehicle. In the case illustrated in FIG. 3, for example, it is assumed that the control unit 10 has acquired own vehicle speed information representing a speed V(tb+1) at the time tb+1. In this case, the control unit 10 rewrites the information stored in the previous acquisition record ZR2 in the speed table 112 into information stored in the latest acquisition record SR2 and rewrites the information stored in the latest acquisition record SR2 into acquisition time information representing the time tb+1 as a latest speed time and own vehicle speed information representing the speed V(tb+1) as a speed of the own vehicle acquired at the latest speed time. By the rewriting, in the previous acquisition record ZR2 in the speed table 112, the acquisition time information stored in the speed acquisition time field F21 is updated from "time tb−1" to "time tb", and the own vehicle speed information stored in the own vehicle speed field F22 is updated from "speed V(tb−1)" to "speed V(tb)". In the latest acquisition record SR2 in the speed table 112, the acquisition time information stored in the speed acquisition time field F21 is updated from "time tb" to "time tb+1", and the own vehicle speed information stored in the own vehicle speed field F22 is updated from "speed V(tb)" to "speed V(tb+1)".

Referring to the description in the flowchart illustrated in FIG. 4 again, the control unit 10 refers to the position table 111 and the speed table 112 in step S2, and acquires the latest position time and the latest speed time.

For example, if the position table 111 referred to is the position table 111 illustrated in FIG. 5, the control unit 10 acquires the time ta as the latest position time from the latest acquisition record SR1. If the speed table 112 referred to is the speed table 112 illustrated in FIG. 6, the control unit 10 acquires the time tb as the latest speed time from the latest acquisition record SR2. Then, the control unit 10 compares the time ta acquired as the latest position time with the time tb acquired as the latest speed time, to judge whether or not the time ta is newer than the time tb. If the time ta and the time tb to be compared with each other are respectively the times illustrated in FIG. 3, the control unit 10 judges that the latest position time is newer than the latest speed time (step S2: YES).

Then, if the control unit 10 judges that the latest position time is newer than the latest speed time (step S2: YES), the control unit 10 judges whether or not a time period between the latest position time and the latest speed time exceeds a time period between the latest speed time and the previous position time (step S3). The control unit 10 refers to the position table 111 and the speed table 112, to judge whether or not the time period between the latest position time and the latest speed time exceeds the time period between the latest speed time and the previous position time in step S3.

For example, it is assumed that the position table 111 referred to is the position table 111 illustrated in FIG. 5, and the speed table 112 referred to is the speed table 112 illustrated in FIG. 6. The control unit 10 refers to the position table 111 and the speed table 112, to acquire the time ta as the latest position time from the latest acquisition record SR1, acquire the time tb as the latest speed time from the latest acquisition record SR2, and acquire the time ta−1 as the previous position time from the previous acquisition record ZR1 in step S3. The control unit 10 judges whether or not "time ta−time tb" as the time period between the latest position time and the latest speed time exceeds "(time tb)−(time ta−1)" as the time period between the latest speed time and the previous position time. If the time ta, the time tb, and the time ta−1 are respectively the times illustrated in FIG. 3, "time ta−time tb" exceeds "(time tb)−(time ta−1)", as illustrated in FIG. 3. Accordingly, the control unit 10 judges that the time period between the latest position time and the latest speed time exceeds the time period between the latest speed time and the previous position time (step S3: YES).

If the control unit 10 judges that the time period between the latest position time and the latest speed time exceeds the time period between the latest speed time and the previous position time (step S3: YES), the control unit 10 selects, for the own vehicle position information and the own vehicle speed information included in the vehicle information to be transmitted to the other vehicle, respectively, the position of the own vehicle acquired at the previous position time as the position of the own vehicle represented by the own vehicle position information and the speed of the own vehicle acquired at the latest speed time as the speed of the own vehicle represented by the own vehicle speed information (step S6).

Then, the control unit 10 generates vehicle information including the own vehicle position information representing the position of the own vehicle selected in step S6, the own vehicle speed information representing the speed of the own vehicle selected in step S6, and acquisition time information representing the previous position time (step S9). The control unit 10 causes the vehicle-to-vehicle communication unit 15 to transmit the generated vehicle information to the other vehicle (step S10).

When a trigger for transmitting the vehicle information has occurred at the time tc, as illustrated in FIG. 3, for example, the control unit 10 judges that the time ta as the latest position time is newer than the time tb as the latest speed time. Then, the control unit 10 judges that "time ta−time tb" as the time period between the latest position time and the latest speed time exceeds "(time tb)−(time ta−1)" as the time period between the latest speed time and the previous position time. Then, the control unit 10 selects the position P(ta−1) as the position of the own vehicle represented by the own vehicle position information and selects the speed V(tb) as the speed of the own vehicle represented by the own vehicle speed information. The control unit 10 generates vehicle information including the own vehicle position information representing the position P(ta−1), the own vehicle speed information representing the speed V(tb), and acquisition time information representing the time ta−1 as the previous position time, and causes the vehicle-to-vehicle communication unit 15 to transmit the vehicle information to the other vehicle. As a result, the other vehicle can estimate the position of the own vehicle with high accuracy. Here, this effect will be described in detail.

The other vehicle estimates, when it receives the vehicle information including the own vehicle position information representing the position P(ta−1), the own vehicle speed information representing the speed V(tb), and the acquisition time information representing the time ta−1 as the previous position time, the position of the own vehicle using the above-described calculation based on the vehicle information. That is, the other vehicle estimates a position obtained by adding a correction amount of "speed V(tb)× (time tj−(time ta−1))" to the position P(ta−1) as the position of the own vehicle. Note that a time tj represents a time when the other vehicle has received the vehicle information. That is, the other vehicle estimates the position of the own vehicle by setting the position of the own vehicle acquired at the time ta−1 as the position P(ta−1) and setting the speed of the own vehicle acquired at the time ta−1 as the speed V(tb).

As illustrated in FIG. 3, the time tb when the speed V(tb) as the speed of the own vehicle has been acquired is closer to the time ta−1 when the position P(ta−1) as the position of the own vehicle has been acquired than the time ta when the position P(ta) as the position of the own vehicle has been acquired. That is, the control unit 10 in the vehicle-mounted communication device 1 transmits a combination of the position of the own vehicle and the speed of the own vehicle respectively acquired at acquisition times which have been inhibited from shifting from each other with the combination included in the vehicle information. Accordingly, the other vehicle calculates a correction amount using the position of the own vehicle and the speed of the own vehicle the respective acquisition times of which have been inhibited from shifting from each other, and thus can calculate a correction amount with higher accuracy than a correction amount based on the position P(ta) and the speed V(tb), for example. Therefore, the other vehicle can estimate the position of the own vehicle with high accuracy.

Referring to the description in step S3 in the flowchart illustrated in FIG. 4 again, if the control unit 10 judges that the time period between the latest position time and the latest speed time does not exceed the time period between the latest speed time and the previous position time (step S3: NO), the control unit 10 selects, for the own vehicle position information and the own vehicle speed information included in the vehicle information, respectively, a position of the own vehicle acquired at the latest position time as the position of the own vehicle represented by the own vehicle position information and a speed of the own vehicle acquired at the latest speed time as the speed of the own vehicle represented by the own vehicle speed information (step S7). Then, the control unit 10 generates vehicle information including the own vehicle position information representing the position of the own vehicle selected in step S7, the own vehicle speed information representing the speed of the own vehicle selected in step S7, and acquisition time information representing the latest position time (step S9). The control unit 10 causes the vehicle-to-vehicle communication unit 15 to transmit the vehicle information to the other vehicle (step S10).

Here, detailed description is made with reference to FIG. 7.

FIG. 7 is a diagram illustrating an example of respective timings at which a position of the own vehicle and a speed of the own vehicle are acquired.

In the example illustrated in FIG. 7, the control unit 10 in the vehicle-mounted communication device 1 in the own vehicle acquires own vehicle position information from the GPS receiving unit 141 periodically at intervals of a time period T3. This time period T3 corresponds to a period in which the GPS receiving unit 141 receives a GPS signal. In the example illustrated in FIG. 7, the control unit 10 in the vehicle-mounted communication device 1 in the own vehicle acquires own vehicle position information representing a position P(te) as the position of the own vehicle at a time te. The control unit 10 in the vehicle-mounted communication device 1 in the own vehicle acquires own vehicle position information representing a position P(te+1) as the position of the own vehicle at a time te+1 after an elapse of the time period T3 from the time te. The vehicle-mounted communication device 1 in the own vehicle acquires own vehicle position information representing a position P(te+2) as the position of the own vehicle at a time te+2 after an elapse of the time period T3 from the time te+1.

In the example illustrated in FIG. 7, the control unit 10 in the vehicle-mounted communication device 1 in the own vehicle acquires own vehicle speed information from the vehicle speed sensor 143 periodically at intervals of a time period T4. This time period T4 corresponds to a period in which the vehicle speed sensor 143 detects a number of revolutions of the axle. In the example illustrated in FIG. 7, the control unit 10 in the vehicle-mounted communication device 1 in the own vehicle acquires own vehicle speed information representing a speed V(tf−1) as the speed of the own vehicle at a time tf−1. The control unit 10 in the vehicle-mounted communication device 1 in the own vehicle acquires own vehicle speed information representing a speed V(tf) as the speed of the own vehicle at a time tf after an elapse of the time period T4 from the time tf−1. The vehicle-mounted communication device 1 in the own vehicle acquires own vehicle speed information representing a speed V(tf+1) as the speed of the own vehicle at a time tf+1 after an elapse of the time period T4 from the time tf.

As illustrated in FIG. 7, a timing at which the vehicle-mounted communication device 1 in the own vehicle acquires the own vehicle position information and a timing at which the vehicle-mounted communication device 1 acquires the own vehicle speed information are not synchronized with each other.

Here, it is assumed that a trigger for transmitting vehicle information has occurred at a time th illustrated in FIG. 7.

It is also assumed that the latest acquisition record SR1 in the position table 111 at the time th stores acquisition time information representing the time te+1 in the position acquisition time field F11 and stores own vehicle position information representing the position P(te+1) in the own vehicle position field F12.

It is also assumed that the previous acquisition record ZR1 in the position table 111 at the time th stores acquisition time information representing the time te in the position acquisition time field F11 and stores own vehicle position information representing the position P(te) in the own vehicle position field F12.

It is also assumed that the latest acquisition record SR2 in the speed table 112 at the time th stores acquisition time information representing the time tf in the speed acquisition time field F21 and stores own vehicle speed information representing the speed V(tf) in the own vehicle speed field F22.

It is also assumed that the previous acquisition record ZR2 in the speed table 112 at the time th stores acquisition time information representing the time tf−1 in the speed acquisition time field F21 and stores own vehicle speed information representing the speed V(tf−1) in the own vehicle speed field F22.

When a trigger for transmitting the vehicle information occurs at the time th illustrated in FIG. 7, the control unit 10 judges that "(time te+1)−(time tf)" as a time period between the latest position time and the latest speed time does not exceed "time tf−time te" as a time period between the latest speed time and the previous position time because the time te+1 as the latest position time is newer than the time tf as the latest speed time. Then, the control unit 10 selects the position P(te+1) corresponding to the latest position time as the position of the own vehicle represented by the own vehicle position information and selects the speed V(tf) corresponding to the latest speed time as the speed of the own vehicle represented by the own vehicle speed information. The control unit 10 generates vehicle information including the own vehicle position information representing the position P(te+1), the own vehicle speed information representing the speed V(tf), and acquisition time information representing the time te+1 as the latest position time, and causes the vehicle-to-vehicle communication unit 15 to transmit the vehicle information to the other vehicle.

The other vehicle estimates, when it receives the vehicle information including the own vehicle position information representing the position P(te+1), the own vehicle speed information representing the speed V(tf), and the acquisition time information representing the time te+1 as the latest position time, the position of the own vehicle using the above-described calculation based on the vehicle information. That is, the other vehicle estimates a position obtained by adding a correction amount of "speed V(tf)×(time tj−(time te+1))" to the position P(te+1) as the position of the own vehicle. Note that a time tj represents a time when the other vehicle has received the vehicle information. As illustrated in FIG. 7, the time te+1 when the position P(te+1) as the position of the own vehicle has been acquired is an acquisition time, at which the position of the own vehicle has been acquired, closest to the time tf when the speed V(tf) as the speed of the own vehicle has been acquired. That is, the control unit 10 in the vehicle-mounted communication device 1 transmits a combination of the position of the own vehicle and the speed of the own vehicle respectively acquired at acquisition times which have been inhibited from shifting from each other with the combination included in the vehicle information. Accordingly, the other vehicle can calculate the correction amount using the position of the own vehicle and the speed of the own vehicle the respective acquisition times of which have been inhibited from shifting from each other, and thus can calculate the correction amount with high accuracy. Therefore, the other vehicle can estimate the position of the own vehicle with high accuracy.

Referring to the description in step S2 in the flowchart illustrated in FIG. 4 again, the control unit 10 refers to the position table 111 and the speed table 112, to judge whether or not the latest position time is newer than the latest speed time (step S2). If the control unit 10 judges that the latest position time is not newer than the latest speed time (step S2: NO), the control unit 10 judges whether or not the time period between the latest position time and the latest speed time exceeds the time period between the latest position time and the previous speed time (step S4).

Then, if the control unit 10 judges that the time period between the latest position time and the latest speed time does not exceed the time period between the latest position time and the previous speed time (step S4: NO), the control unit 10 selects the position of the own vehicle acquired at the latest position time as the position of the own vehicle represented by the own vehicle position information and selects the speed of the own vehicle acquired at the latest speed time as the speed of the own vehicle represented by the own vehicle speed information (step S7). Then, the control unit 10 generates vehicle information including the own vehicle position information representing the position of the own vehicle selected in step S7, the own vehicle speed information representing the speed of the own vehicle selected in step S7, and acquisition time information representing the latest position time (step S9). The control unit 10 causes the vehicle-to-vehicle communication unit 15 to transmit the vehicle information to the other vehicle (step S10).

For example, it is assumed that a trigger for transmitting vehicle information has occurred at a time td illustrated in FIG. 3. In this case, the latest position time is the time ta, the latest speed time is the time tb+1, and the previous speed time is the time tb. Therefore, the control unit 10 judges in step S2 that the time ta as the latest position time is not newer than the time tb+1 as the latest speed time. The control unit 10 judges whether or not "(time tb+1)−time ta" as the time period between the latest position time and the latest speed time exceeds "time ta−time tb" as the time period between the latest position time and the previous speed time. As illustrated in FIG. 3, "(time tb+1)−time ta" does not exceed "time ta−time tb". Thus, the control unit 10 selects the position of the own vehicle represented by the own vehicle position information as the position P(ta) and selects the speed of the own vehicle represented by the own vehicle speed information as the speed V(tb+1). The control unit 10 generates vehicle information including the own vehicle position information representing the position P(ta), the own vehicle speed information representing the speed V(tb+1), and acquisition time information representing the time ta as the latest position time, and causes the vehicle-to-vehicle communication unit 15 to transmit the vehicle information to the other vehicle.

The other vehicle estimates, when it receives the vehicle information including the own vehicle position information representing the position P(ta), the own vehicle speed information representing the speed V(tb+1), and the acquisition time information representing the time ta as the latest position time, the position of the own vehicle using the above-described calculation based on the vehicle information. That is, the other vehicle estimates a position obtained by adding a correction amount of "speed V(tb+1)×(time tj−(time ta))" to the position P(ta) as the position of the own vehicle. Note that a time tj represents a time when the other vehicle has received the vehicle information. As illustrated in FIG. 3, the time tb+1 when the speed V(tb+1) as the speed of the own vehicle has been acquired is an acquisition time, at which the position of the own vehicle has been acquired, closest to the time ta when the position P(ta) as the position of the own vehicle has been acquired. That is, the control unit 10 in the vehicle-mounted communication device 1 transmits a combination of the position of the own vehicle and the speed of the own vehicle respectively acquired at acquisition times which have been inhibited from shifting from each other with the combination included in the vehicle information. Accordingly, the other vehicle can calculate the correction amount using the position of the own vehicle and the speed of the own vehicle the respective acquisition times of which have been inhibited from shifting from each other, and can calculate the correction amount with high accuracy. Therefore, the other vehicle can estimate the position of the own vehicle with high accuracy.

Referring to the description in step S4 in the flowchart again, if the control unit 10 judges that the time period between the latest position time and the latest speed time exceeds the time period between the latest speed time and the previous position time (step S4: YES), the control unit 10 judges whether or not a difference between the speed of the own vehicle acquired at the latest speed time and the speed of the own vehicle acquired at the previous speed time is a predetermined threshold value or more (step S5). The control unit 10 refers to the speed table 112, to judge whether or not the difference between the speed of the own vehicle acquired at the latest speed time and the speed of the own vehicle acquired at the previous speed time is the predetermined threshold value or more. The predetermined threshold value is previously stored in the storage unit 11. Details of the predetermined threshold value will be described below.

For example, if the speed table 112 referred to is the speed table 112 illustrated in FIG. 6, the control unit 10 acquires the speed V(tb) as the speed of the own vehicle acquired at the time tb as the latest speed time, and acquires the speed V(tb−1) as the speed of the own vehicle acquired at the time tb−1 as the previous speed time. The control unit 10 judges whether or not a difference between the speed V(tb) and the speed V(tb−1) is the predetermined threshold value or more.

If the control unit 10 judges that the difference between the speed of the own vehicle acquired at the latest speed time and the speed of the own vehicle acquired at the previous speed time is not the predetermined threshold value or more (step S5: NO), the control unit 10 selects a position of the own vehicle acquired at the latest position time as the position of the own vehicle represented by the own vehicle position information and selects a speed of the own vehicle acquired at the previous speed time as the speed of the own vehicle represented by the own vehicle speed information (step S8). Then, the control unit 10 generates vehicle information including the own vehicle position information representing the position of the own vehicle and the own vehicle speed information representing the speed of the own vehicle selected in step S8, and acquisition time information representing the latest position time (step S9). The control unit 10 causes the vehicle-to-vehicle communication unit 15 to transmit the vehicle information to the other vehicle (step S10).

When a trigger for transmitting the vehicle information has occurred at the time tg illustrated in FIG. 7, for example, the control unit 10 judges that "(time tf)−(time te)" as a time period between the latest position time and the latest speed time exceeds "time te−(time tf−1)" as a time period between the latest position time and the previous speed time because the time tf as the latest speed time is newer than the time te as the latest position time. Then, the control unit 10 judges whether or not a difference between the speed V(tf) as the speed of the own vehicle acquired at the time tf and the speed V(tf−1) as the speed of the own vehicle acquired at the time tf−1 is a predetermined threshold value or more. If the control unit 10 judges that the difference is not the predetermined threshold value or more, the control unit 10 selects the position P(te) corresponding to the latest position time as the position of the own vehicle represented by the own vehicle position information and selects the speed V(tf−1) corresponding to the previous speed time as the speed of the own vehicle represented by the own vehicle speed information. The control unit 10 generates vehicle information including the own vehicle position information representing the position P(te), the own vehicle speed information representing the speed V(tf−1), and acquisition time information representing the time te as the latest position time, and causes the vehicle-to-vehicle communication unit 15 to transmit the vehicle information to the other vehicle.

The other vehicle estimates, when it receives the vehicle information including the own vehicle position information representing the position P(te), the own vehicle speed information representing the speed V(tf−1), and the acquisition time information representing the time te as the latest position time, the position of the own vehicle using the above-described calculation based on the vehicle information. That is, the other vehicle estimates a position obtained by adding a correction amount of "speed V(tf−1)×(time tj−time te)" to the position P(te) as the position of the own vehicle. Note that a time tj represents a time when the other vehicle has received the vehicle information. As illustrated in FIG. 7, the time te when the position P(te) as the position of the own vehicle has been acquired is an acquisition time, at which the position of the own vehicle has been acquired, closest to the time tf−1 when the speed V(tf−1) as the speed of the own vehicle has been acquired. That is, the control unit 10 in the vehicle-mounted communication device 1 transmits a combination of the position of the own vehicle and the speed of the own vehicle respectively acquired at acquisition times which have been inhibited from shifting from each other with the combination included in the vehicle information. Accordingly, the other vehicle can calculate the correction amount using the position of the own vehicle and the speed of the own vehicle the respective acquisition times of which have been inhibited from shifting from each other, and can calculate the correction amount with high accuracy. Therefore, the other vehicle can estimate the position of the own vehicle with high accuracy.

Referring to the description in step S5 again, if the control unit 10 judges that the difference between the speed of the own vehicle acquired at the latest speed time and the speed of the own vehicle acquired at the previous speed time is the predetermined threshold value or more (step S5: YES), the control unit 10 selects a position of the own vehicle acquired at the latest position time as the position of the own vehicle represented by the vehicle position information and selects a speed of the own vehicle acquired at the latest speed time as the speed of the own vehicle represented by the own vehicle speed information (step S7). Then, the control unit 10 generates vehicle information including the own vehicle position information representing the position of the own vehicle selected in step S7, the own vehicle speed information representing the speed of the own vehicle selected in step S7, and acquisition time information representing the latest position time (step S9). The control unit 10 causes the vehicle-to-vehicle communication unit 15 to transmit the vehicle information to the other vehicle (step S10).

When the trigger for transmitting the vehicle information has occurred at the time tg illustrated in FIG. 7, for example, the control unit 10 judges that "(time tf)−(time te)" as the time period between the latest position time and the latest speed time exceeds "time te−(time tf−1)" as the time period between the latest position time and the previous speed time because the time tf as the latest speed time is newer than the time te as the latest position time. Then, the control unit 10 judges whether or not the difference between the speed V(tf) as the speed of the own vehicle acquired at the time tf and the speed V(tf−1) as the speed of the own vehicle acquired at the time tf−1 is the predetermined threshold value or more. If the control unit judges that the difference is the predetermined threshold value or more, the control unit 10 selects the position P(te) corresponding to the latest position time as the position of the own vehicle represented by the own vehicle position information and selects the speed V(tf) corresponding to the latest speed time as the speed of the own vehicle represented by the own vehicle speed information. The control unit 10 generates vehicle information including the own vehicle position information representing the position P(te), the own vehicle speed information representing the speed V(tf), and acquisition time information representing the time te as the latest position time, and causes the vehicle-to-vehicle communication unit 15 to transmit the vehicle information to the other vehicle.

Thus, when the difference between the speed of the own vehicle acquired at the latest speed time and the speed of the own vehicle acquired at the previous speed time is the predetermined threshold value or more, the control unit 10 transmits a combination of the position of the own vehicle and the speed of the own vehicle respectively acquired at the latest acquisition times with the combination included in the vehicle information even if the acquisition time of the position of the own vehicle and the acquisition time of the speed of the own vehicle greatly shift from each other. As a result, the other vehicle can estimate the position of the own vehicle with high accuracy. Here, this effect will be described.

FIG. 8 is a diagram for describing a position of the own vehicle estimated by the other vehicle.

In FIG. 8, a case where the own vehicle is moving in a direction X (a direction from the left to the right in the drawing) on a road DR is illustrated. In the description using FIG. 8, it is assumed that the control unit 10 in the vehicle-mounted communication device 1 in the own vehicle acquires own vehicle position information and own vehicle speed information in the period illustrated in FIG. 7. That is, it is assumed that the control unit 10 in the vehicle-mounted communication device 1 in the own vehicle acquires the own vehicle position information from the GPS receiving unit 141 periodically at intervals of a time period T3, and acquires the own vehicle speed information from the vehicle speed sensor 143 periodically at intervals of a time period T4. In the description using FIG. 8, a timing at which the own vehicle position information is acquired and a timing at which the own vehicle speed information is acquired are not synchronized with each other, like the timings illustrated in FIG. 7.

FIG. 8 also illustrates estimation of a position of the own vehicle in a case where a trigger for transmitting vehicle information has occurred at the time tg illustrated in FIG. 7.

When the trigger for transmitting the vehicle information occurs at the time tg, the control unit 10 in the vehicle-mounted communication device 1 in the own vehicle selects a position of the own vehicle represented by the own vehicle position information and a speed of the own vehicle represented by the own vehicle speed information. In this case, when the control unit 10 selects a combination of a speed V(tf−1) acquired at a time tf−1 and a position P(te) acquired at a time te is selected as a combination in which respective acquisition times have been inhibited from shifting from each other, the other vehicle may be unable to estimate the position of the own vehicle with high accuracy.

FIG. 8 illustrates how the speed of the own vehicle is displaced between the time tf−1 and a time tf. That is, FIG. 8 illustrates how the speed of the own vehicle is displaced from the speed V(tf−1) to a speed (Vtf) until the time tf after the time tf−1. Sizes of arrows respectively assigned "V(tf−1)" and "(Vtf)" each indicate a magnitude of a speed and indicate that the speed of the own vehicle has decelerated until the time tf after the time tf−1 in FIG. 8.

When the trigger for transmitting the vehicle information occurs at the time tg, and own vehicle position information representing the position P(te) and own vehicle speed information representing the speed V(tf−1) are transmitted to the other vehicle, the other vehicle estimates a position P'(tj) obtained by adding a correction amount of "speed V(tf−1)× (time tj−time te)" to the position P(te) as the position of the own vehicle. That is, the other vehicle estimates the position P'(tj) as the position of the own vehicle, assuming that the own vehicle has moved at the speed V(tf−1) from the position P(te) in a time period from the time te to a time tj. Note that the time tj is a time when the other vehicle receives the vehicle information from the own vehicle. Thus, when the combination in which the respective acquisition times have been inhibited from shifting from each other is received, the other vehicle estimates the position of the own vehicle, assuming that the other vehicle is moving at the speed V(tf−1) from the position P(te) regardless of the speed of the own vehicle having decelerated from the speed V(tf−1) to the speed V(tf). Accordingly, the other vehicle estimates the position P'(tj) deviating from the position P(tj) as an actual position of the own vehicle as the position of the own vehicle.

Note that, although a case where the own vehicle has decelerated before the trigger for transmitting the vehicle information occurs is illustrated in FIG. 8, the same is true for a case where the own vehicle has accelerated. The other vehicle may estimate a position deviating from an actual position of the own vehicle as the position of the own vehicle.

Therefore, if the difference between the speed of the own vehicle corresponding to the latest speed time and the speed of the own vehicle corresponding to the previous speed time is the predetermined threshold value or more, the control unit 10 in the vehicle-mounted communication device 1 in the own vehicle transmits the combination of the position of the own vehicle and the speed of the own vehicle the respective acquisition times of which are newest with the combination included in the vehicle information, as described above. That is, the control unit 10 transmits the own vehicle speed information representing the speed (tf) and the own vehicle position information representing the position P(te) with the information included in the vehicle information in the case illustrated in FIG. 8. The predetermined threshold value is determined by a previous test or simulation, for example, as a threshold value of a difference in speed at which an error between a position of the own vehicle estimated using the speed of the own vehicle acquired at the previous speed time and an actual position of the own vehicle falls within a predetermined allowable range. Therefore, when the control unit 10 performs negative judgment in step S5 (step S5: NO), this indicates that the error between the position of the own vehicle estimated using the speed of the own vehicle acquired at the previous speed time and the actual position of the own vehicle exceeds the allowable range. On the other hand, when the control unit 10 performs affirmative judgment in step S5 (step S5: YES), this indicates that the error between the position of the own vehicle estimated using the speed of the own vehicle acquired at the previous speed time and the actual position of the own vehicle does not exceed the allowable range.

The other vehicle estimates, when the speed of the own vehicle is displaced before the trigger for transmitting the vehicle information occurs and a degree of the displacement is a predetermined threshold value or more, the position of the own vehicle using the speed of the own vehicle the acquisition time of which is new. Accordingly, the other vehicle estimates the position of the own vehicle without using the speed of the own vehicle, acquired at the previous speed time, the acquisition time of which is old. Thus, the error exceeding the allowable range can be inhibited from being included in the estimated position of the own vehicle. Therefore, the own vehicle can inhibit the position of the own vehicle estimated by the other vehicle and the actual position of the own vehicle from deviating from each other even when the own vehicle has accelerated or decelerated before the trigger for transmitting the vehicle information occurs. The other vehicle can estimate the position of the own vehicle with high accuracy even when the own vehicle bas accelerated or decelerated before the trigger for transmitting the vehicle information occurs.

As described above, the control unit 10 in the vehicle-mounted communication device 1 transmits vehicle-mounted information including a plurality of types of position estimation information (the own vehicle position information and the own vehicle speed information in the present embodiment). Among the plurality of types of position estimation information to be transmitted, the at least one type of position estimation information is position estimation information with which the latest acquisition time is associated, and the other type of position estimation information different from the one type of position estimation information is position estimation information with which acquisition time information representing an acquisition time closest to an acquisition time of the one type of position estimation information is associated. Therefore, the other vehicle can estimate the position of the own vehicle with high accuracy because it estimates the position of the own vehicle based on a combination of the one type of position estimation information and the other type of position estimation information the respective acquisition times of which have been inhibited from shifting from each other. The at least one type of position estimation information is the latest position estimation information. Thus, the other vehicle can be inhibited from estimating the position of the own vehicle using the position estimation information deviating from (i.e., older than) the current time. Accordingly, the other vehicle can use the position estimation information the acquisition time of which is as new as possible, i.e., the acquisition time of which is close to the current time, and can estimate the position of the own vehicle with high accuracy.

As described above, the vehicle-mounted communication device 1 according to the present embodiment includes the vehicle-to-vehicle communication device 15 (the communication unit), the position estimation information acquisition unit 14 which periodically acquires the plurality of types of position estimation information capable of estimating the position of the vehicle, the storage unit 11 which stores the plurality of types of position estimation information acquired by the position estimation information acquisition unit 14 with the acquisition time information representing the acquisition time at which each of the position estimation information has been acquired associated with the position estimation information, and the control unit 10 which causes the vehicle-to-vehicle communication unit 15 to transmit the vehicle-mounted information (information) including the at least plurality of types of position estimation information. Among the plurality of types of position estimation information to be transmitted by the vehicle-to-vehicle communication unit, the at least one type of position estimation information is position estimation information with which the acquisition time information representing the latest acquisition time among the one type of position estimation information is associated, and the other type of position estimation information different from the one type of position estimation information is position estimation information with which the acquisition time information representing the acquisition time closest to the acquisition time at which the one type of position estimation information has been acquired is associated.

As a result, the control unit 10 transmits the vehicle-mounted information including the one type of position estimation information with which the acquisition time information representing the latest acquisition time is associated and the other type of position estimation information different from the one type of position estimation information with which the acquisition time information representing the acquisition time closest to the acquisition time at which the one type of position estimation information has been acquired is associated. Accordingly, the control unit 10 transmits the combination of the one type of position estimation information acquired at the latest acquisition time among the plurality of types of position estimation information to be transmitted and the other type of position estimation information the acquisition time of which has been inhibited from shifting from the acquisition time of the one type of position estimation information. Accordingly, the other vehicle can use the plurality of types of position estimation information the respective acquisition times of which have been inhibited from shifting from one another, and can thus estimate the position of the own vehicle with high accuracy. The other vehicle can also estimate the position of the own vehicle using the position estimation information the acquisition time of which is as new as possible, and can estimate the position of the own vehicle with high accuracy.

The plurality of types of position estimation information to be transmitted include the own vehicle position information representing the position of the own vehicle and the own vehicle speed information representing the speed of the own vehicle.

As a result, the control unit 10 transmits the combination of the position of the own vehicle and the speed of the own vehicle respectively acquired at the acquisition times which have been inhibited from shifting from each other. Thus, the other vehicle can estimate the position of the own vehicle with high accuracy using the above-described calculation.

The timing at which the position estimation information acquisition unit 14 acquires the own vehicle position information and the timing at which the position estimation information acquisition unit 14 acquires the own vehicle speed information are not synchronized with each other. More specifically, the timing at which the GPS receiving unit 141 acquires the own vehicle position information and the timing at which the vehicle speed sensor 143 acquires the own vehicle speed information are not synchronized with each other.

The reason why the timing at which the GPS receiving unit 141 acquires the own vehicle position information and the timing at which the vehicle speed sensor acquires the own vehicle speed information are not synchronized with each other, as described above, is that the own vehicle position information and the own vehicle speed information are respectively acquired in different modules and calculated by different processes. Unless the timing at which the own vehicle position information is acquired and the timing at which the own vehicle speed information is acquired are thus synchronized with each other, the own vehicle may transmit the vehicle information including the own vehicle position information and the own vehicle speed information the respective acquisition times of which have greatly shifted from each other, as described above. However, the control unit 10 transmits the vehicle information including the own vehicle position information and the own vehicle speed information the respective acquisition times of which have been inhibited from shifting from each other. Accordingly, the other vehicle can estimate the position of the own vehicle with high accuracy even when the respective timings at which the own vehicle acquires the own vehicle position information and the own vehicle speed information are not synchronized with each other.

The control unit 10 compares the latest position time with the latest speed time, and causes the vehicle-to-vehicle communication unit 15 to transmit, when the latest position time is newer than the latest speed time, the vehicle information including the own vehicle speed information with which the acquisition time information representing the latest speed time is associated and the own vehicle position information with which the acquisition time information representing the acquisition time closest to the latest speed time is associated.

When the trigger for transmitting the vehicle information has occurred at the time tc illustrated in FIG. 3, for example, the control unit 10 judges that the time ta as the latest position time is newer than the time tb as the latest speed time, and transmits the vehicle information including the own vehicle speed information representing the speed V(tb) and the own vehicle position information representing the position P(ta−1) acquired at the time ta−1 as the acquisition time closest to the time tb. Thus, the control unit 10 transmits, even when the latest position time is newer than the latest speed time, the vehicle information including the own vehicle position information and the own vehicle speed information the respective acquisition times of which have been inhibited from shifting from each other. Accordingly, even if the latest position time is newer than the latest speed time when the trigger for transmitting the vehicle information has occurred, the other vehicle can estimate the position of the own vehicle with high accuracy.

The control unit 10 compares the latest position time with the latest speed time, and causes the vehicle-to-vehicle communication unit 15 to transmit, when the latest speed time is newer than the latest position time, the vehicle information including the own vehicle position information with which the acquisition time information representing the latest position time is associated and the own vehicle speed information with which the acquisition time information representing the acquisition time closest to the latest position time is associated.

When the trigger for transmitting the vehicle information has occurred at the time tg illustrated in FIG. 7, for example, the control unit 10 judges that the time tf as the latest speed time is newer than the time te as the latest position time, and transmits the vehicle information including the own vehicle position information representing the position P(te) and the own vehicle speed information representing the speed V(tf−1) acquired at the time tf−1 as the acquisition time closest to the time te. Thus, the control unit 10 transmits, even when the latest speed time is newer than the latest position time, the vehicle information including the own vehicle position information and the own vehicle speed information the respective acquisition times of which have been inhibited from shifting from each other. Accordingly, even if the latest speed time is newer than the latest position time when the trigger for transmitting the vehicle information has occurred, the other vehicle can estimate the position of the own vehicle with high accuracy.

As described above, the control unit 10 compares the latest position time with the latest speed time, and causes the vehicle-to-vehicle communication unit 15 to transmit the vehicle information including the own vehicle position information and the own vehicle speed information corresponding to a comparison result to the other vehicle. Therefore, even if the time when the trigger for transmitting the vehicle information has occurred is any time, the other vehicle can estimate the position of the own vehicle with high accuracy.

The control unit 10 causes the vehicle-to-vehicle communication unit 15 to transmit, when the difference between the speed of the own vehicle at the latest speed time and the speed of the own vehicle at the previous speed time (the acquisition time previous to the latest speed time) for the vehicle speed information is the predetermined threshold value or more, the vehicle information including the own vehicle speed information with which the acquisition time information representing the latest speed time is associated and the own vehicle position information with which the acquisition time information representing the latest position time is associated.

As a result, the own vehicle can inhibit, when the speed of the own vehicle has been displaced before the trigger for transmitting the vehicle information occurs, the position of the own vehicle estimated by the other vehicle and the actual position of the own vehicle from deviating from each other because the other vehicle can estimate the position of the own vehicle using the speed of the own vehicle the acquisition time of which is new. The other vehicle can estimate the position of the own vehicle with high accuracy even when the own vehicle has accelerated or decelerated before the trigger for transmitting the vehicle information occurs.

The above-described embodiment is an example of an aspect of the present invention, and can be optionally deformed and applied without departing from the scope and spirit of the present invention.

For example, in the above-described embodiment, a case where the other vehicle estimates the position of the own vehicle based on the own vehicle position information and the own vehicle speed information included in the received vehicle information has been illustrated. However, the position of the own vehicle may be estimated by adding information representing an acceleration of the own vehicle, for example. The position estimation information used when the other vehicle estimates the position of the own vehicle is not limited to the own vehicle position information and the own vehicle speed information. Note that in this case, the own vehicle transmits vehicle information including the information representing its own acceleration to the other vehicle. Even in this case, if one type of position estimation information is latest position estimation information and another type of position estimation information is position estimation information as an acquisition time closest to an acquisition time of the one type of position estimation information, the own vehicle produces the above-described effect.

If a communication method by the above-described vehicle-mounted communication device 1 is implemented using a computer included in the vehicle-mounted communication device 1, for example, the present invention can also be configured in a form of a program executed by the computer to implement the above-described communication method, a recording medium in which the program is recorded readably by the computer, or a transmission medium for transmitting the program. As the above-described recording medium, a magnetic or optical recording medium or a semiconductor memory device can be used. More specifically, examples of the recording medium include portable or fixed recording media such as a flexible disk, an HDD (Hard Disk Drive), a CD-ROM (Compact Disk Read Only Memory), a DVD (Digital Versatile Disk), a Blu-ray (registered trademark) Disc, a magnetooptical disk, a flash memory, and a card-type recording medium. The above-described recording medium may be a non-volatile storage device such as a ROM (Read only Memory) or an HDD as an internal storage device included in the vehicle-mounted communication device 1.

For example, FIG. 1 is a schematic view illustrating a functional configuration of the vehicle-mounted communication device 1 with the functional configuration classified depending on a main processing content to facilitate understanding of the present invention. The configuration of the vehicle-mounted communication device 1 can also be classified into still more components depending on the processing content. Alternatively, the configuration of the vehicle-mounted communication device 1 can also be classified such that one component performs still more processes.

For example, processing units in the flowchart illustrated in FIG. 4 are divisions obtained depending on the main processing content to facilitate understanding of the processing of the vehicle-mounted communication device 1. The present invention is not restricted depending on a division for obtaining the processing units and respective names of the processing units. The processing of the vehicle-mounted communication device 1 may be divided into still more processing units depending on the processing content. Alternatively, the processing of the vehicle-mounted communication device 1 may be divided such that the one processing unit includes still more processes.

REFERENCE SIGNS LIST

1 Vehicle-mounted communication device
10 Control unit
11 Storage unit
14 Position estimation information acquisition unit
15 Vehicle-to-vehicle communication unit (communication unit)

The invention claimed is:

1. A vehicle-mounted communication device loaded into a vehicle, comprising:
   a communication device which transmits information;
   a position estimation information acquisition circuit including a GPS receiver, which receives a GPS signal transmitted from a GPS satellite via a GPS antenna, and a vehicle speed sensor, and the position estimation information acquisition circuit which periodically acquires a plurality of types of position estimation information capable of estimating a position of the vehicle including vehicle position information representing a position of the vehicle, and vehicle speed information representing a speed of the vehicle based on information received by the GPS receiver and a detection result of the vehicle speed sensor;
   a memory which stores the plurality of types of position estimation information acquired by the position estimation information acquisition circuit with acquisition time information representing an acquisition time at which each of the position estimation information is acquired associated with the position estimation information; and
   a control circuit including a CPU which causes the communication device to transmit information including the at least plurality of types of position estimation information,
   wherein a timing at which the position estimation information acquisition circuit acquires the vehicle position information and a timing at which the position estimation information acquisition circuit acquires the vehicle speed information are not synchronized with each other,
   wherein among the plurality of types of position estimation information transmitted from the communication device controlled by the control circuit,
   the at least one type of position estimation information is the position estimation information with which the acquisition time information representing the latest acquisition time is associated among the one type of position estimation information, and the other type of the position estimation information different from the one type of the position estimation information is the position estimation information with which the acquisition time information representing the acquisition time closest to the acquisition time at which the one type of position estimation information is acquired is associated,
   wherein the control circuit selects a combination of the vehicle position information and the vehicle speed information respectively acquired at acquisition times which are inhibited from shifting from each other, and the combination of the vehicle position information and the vehicle speed information is transmitted as the position estimation information by the communication device.

2. The vehicle-mounted communication device according to claim 1, wherein
   the control circuit
   compares a latest position time as the latest acquisition time of the vehicle position information with a latest speed time as the latest acquisition time of the vehicle speed information, and causes the communication device to transmit, when the latest position time is newer than the latest speed time, information including the vehicle speed information with which the acquisition time information representing the latest speed time is associated and the vehicle position information with which the acquisition time information representing the acquisition time closest to the latest speed time is associated.

3. The vehicle-mounted communication device according to claim 1, wherein
   the control circuit
   compares a latest position time as the latest acquisition time of the vehicle position information with a latest speed time as the latest acquisition time of the vehicle speed information, and causes the communication device to transmit, when the latest speed time is newer than the latest position time, information including the vehicle position information with which the acquisition time information representing the latest position time is associated and the vehicle speed information with which the acquisition time information representing the acquisition time closest to the latest position time is associated.

4. The vehicle-mounted communication device according to claim 1, wherein
   the control circuit
   causes the communication device to transmit, when a difference between a speed of the vehicle at a latest speed time as the latest acquisition time of the vehicle speed information and a speed of the vehicle at the acquisition time before the latest speed time is a predetermined threshold value or more, information including the vehicle speed information with which the acquisition time information representing the latest speed time is associated and the vehicle position information with which the acquisition time information representing a latest position time as the latest acquisition time of the vehicle position information is associated.

5. A communication method comprising the steps of:
   receiving a GPS signal transmitted from a GPS satellite via a GPS antenna in a GPS receiver;
   detecting a speed of a vehicle by a vehicle speed sensor;
   periodically acquiring a plurality of types of position estimation information including vehicle position information representing a position of a vehicle and vehicle speed information representing a speed of the vehicle, capable of estimating a position of a vehicle by a position estimation information acquisition circuit;
   acquiring the vehicle position information and the vehicle speed information at timings which are not synchronized with each other;
   storing the acquired plurality of types of position estimation information with acquisition time information representing an acquisition time at which each of the position estimation information is acquired associated with the position estimation information in a memory; and transmitting information including the plurality of types of position estimation information, among which the at least one type of position estimation information is the position estimation information with which the acquisition time information representing the latest acquisition time is associated among the one type of position estimation information and the other type of position estimation information different from the one type of position estimation information is the position estimation information with which the acquisition time information representing the acquisition time closest to the acquisition time at which the one type of position estimation information is acquired is associated, wherein the step of transmitting includes selecting a combination of the vehicle position information and the vehicle speed information respectively acquired at acquisition times which are inhibited from shifting from each other, and transmitting the combination of the vehicle position information and the vehicle speed information as the position estimation information by the communication device.

6. The vehicle-mounted communication device according to claim 1, wherein the control circuit compares a first time difference between, among an acquisition time at which latest vehicle position information is acquired as the position estimation information and an acquisition time at which latest vehicle speed information is acquired as the position estimation information, the acquisition times whichever is newer in one type of the position estimation information, and a latest acquisition time of another type of the position estimation information which is different from the one type, and a second time difference between the latest acquisition time of another type of the position estimation information which is different from the one type and a previous acquisition time of the one type, and acquires the position estimation information including a combination of the vehicle position information and the vehicle speed information selected based on the first time difference and the second time difference whichever is smaller, and transmits the position estimation information by the communication device.

* * * * *